P. H. SMITH.
STEERING GEAR FOR MOTOR SLEIGHS.
APPLICATION FILED JAN. 4, 1916.
1,223,210.
Patented Apr. 17, 1917.
3 SHEETS—SHEET 1.
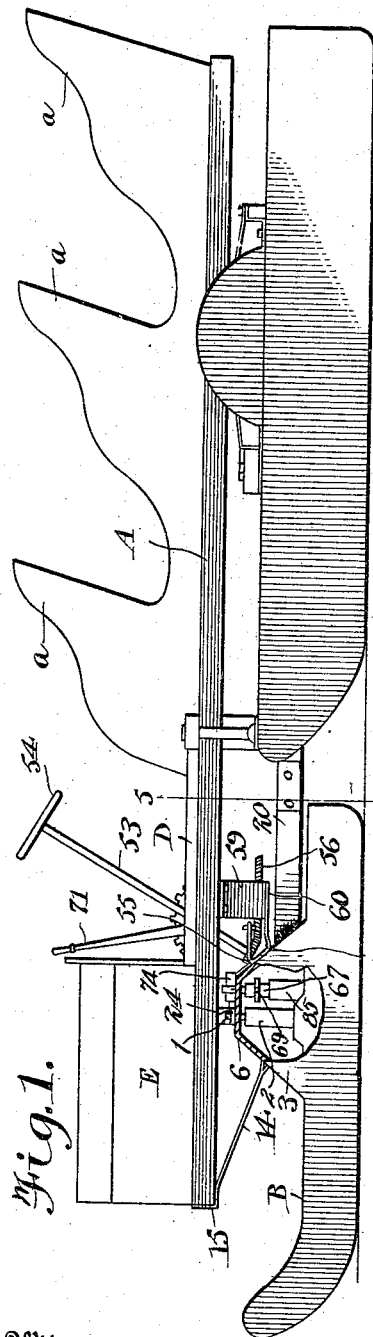
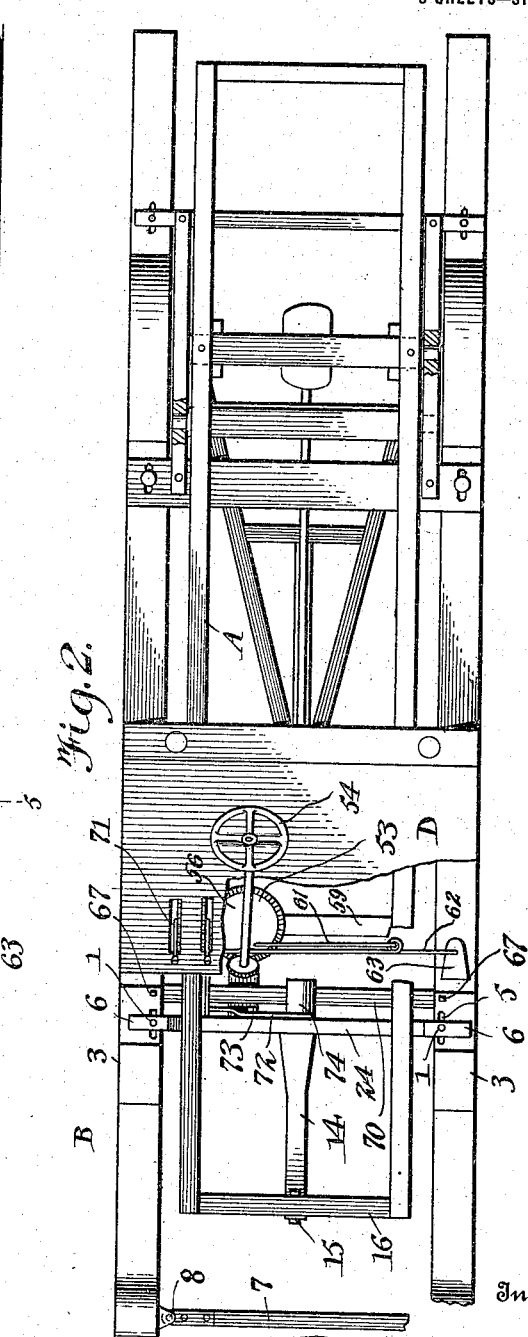
Witnesses
Frederick W. Ely
R. M. Smith
Inventor
Peter H. Smith.
By Victor J. Evans
Attorney

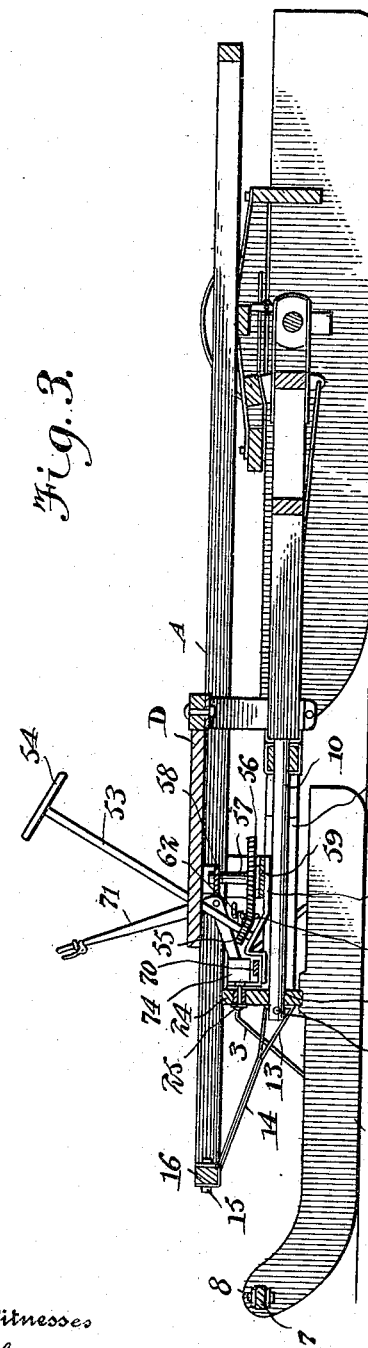
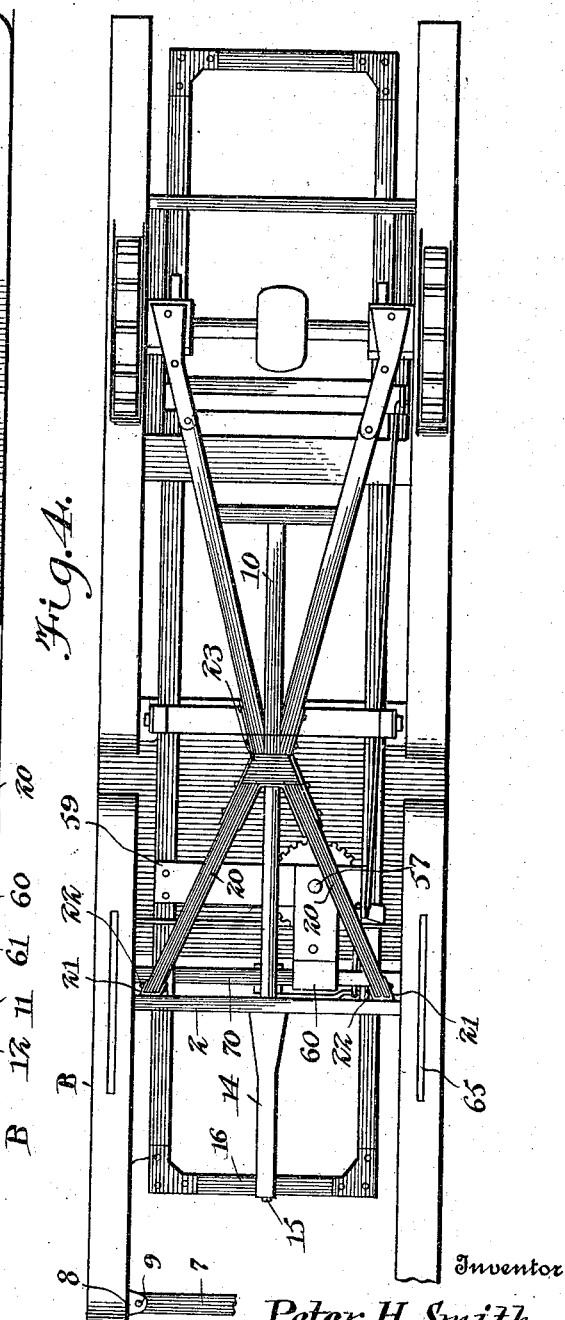

P. H. SMITH.
STEERING GEAR FOR MOTOR SLEIGHS.
APPLICATION FILED JAN. 4, 1916.
1,223,210.
Patented Apr. 17, 1917.
3 SHEETS—SHEET 3.
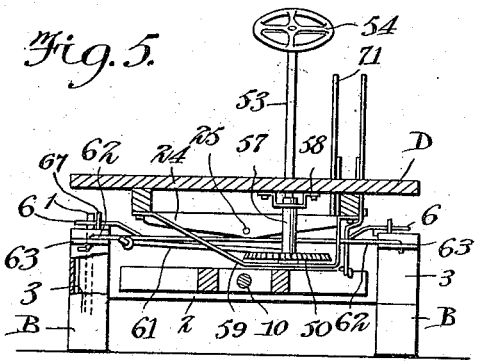
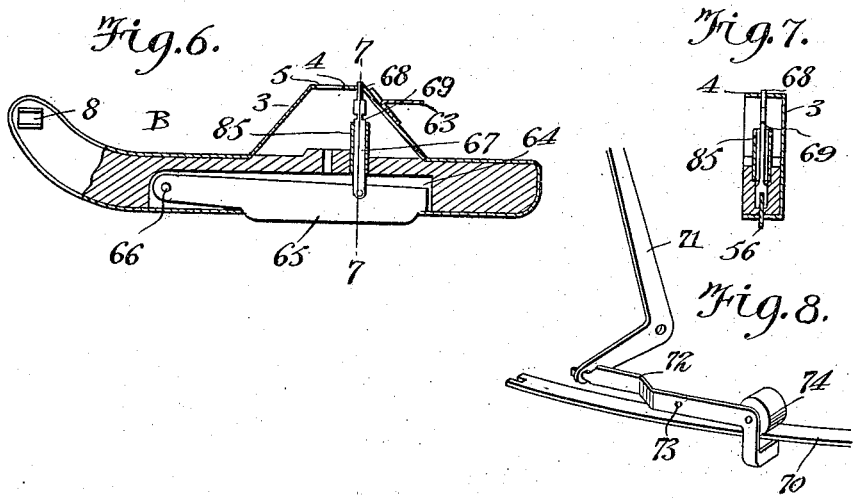

UNITED STATES PATENT OFFICE.

PETER H. SMITH, OF LOUGHEED, ALBERTA, CANADA.

STEERING-GEAR FOR MOTOR-SLEIGHS.

1,223,210. Specification of Letters Patent. Patented Apr. 17, 1917.

Original application filed March 27, 1915, Serial No. 17,399. Divided and this application filed January 4, 1916. Serial No. 70,312.

*To all whom it may concern:*

Be it known that I, PETER H. SMITH, a subject of the King of Great Britain, residing at Lougheed, in the Province of Alberta and Dominion of Canada, have invented new and useful Improvements in Steering-Gear for Motor-Sleighs, of which the following is a specification.

This invention relates to motor sleighs and constitutes a division of the subject matter embodied in my patent for a motor sleigh No. 1,173,883, dated Feb. 29, 1916.

The main object of the present invention is to provide in connection with the runners and particularly the front runners of a motor sleigh, and steering means therefor, depressible road engaging fins of novel construction and arrangement, together with means for depressing said fins, and means for permitting said fins to yield in an upward direction irrespective of the depressing means, upon coming in contact with a hard object or surface, thereby preventing lateral or side skidding of the sleigh and insuring the perfect steering of the same on hard or soft snow, ice and the like.

With the above and other objects in view, the invention consists in the novel construction, combination and arrangement of parts, as herein described, illustrated and claimed.

In the accompanying drawings:—

Figure 1 is a side elevation of a motor sleigh embodying the present invention.

Fig. 2 is a top plan view thereof partly broken away.

Fig. 3 is a central vertical longitudinal section through the same.

Fig. 4 is a bottom plan view of the sleigh partly broken away.

Fig. 5 is a vertical cross section on the line 5—5 of Fig. 1.

Fig. 6 is a vertical longitudinal section through one of the front runners.

Fig. 7 is a vertical cross section on the line 7—7 of Fig. 6.

Fig. 8 is a perspective view of the fin depressing means.

As shown in Figs. 1 and 2, the motor sleigh comprises a frame or body A hereinafter referred to in the main as the body of the sleigh, it being understood that the part A which is shown merely in the form of a substantially rectangular frame may constitute the body of the machine or a support for the body, *a* designating seats for the passengers and driver or operator.

The body or frame A is supported upon and by front and rear runners, the former being designated generally at B. D represents a platform or floor adjacent to the operator's seat and fastened to the frame or body A. The motor or engine is conventionally indicated at E.

The front runners B are pivotally connected at 1 to the opposite end of a front body bolster 2 to turn on substantially vertical axes for the purpose of steering the sleigh and in order to enable each of the front runners to rock in a fore and aft direction, each of said runners is provided with a hollow knee 3 in which the adjacent end of the truck bolster is received, the top wall 4 of said knee being formed with a fore and aft slot 5 which receives the upper end of the pivot pin 1, 6 designating a strap secured to the top edge of the truck bolster, extending over the tops of the knees 3 and receiving the upper extremities of the pivot pins 1.

The forward extremities of the front runners are connected by a bar or yoke 7 having a jointed connection at its opposite ends with said runners, each of which is provided with a slotted clip 8 to receive the adjacent end of the yoke 7, said parts being pivotally connected together by a pin 9, the joint at the pin 9 being sufficiently loose to allow the forward extremity of one runner to rise and fall without affecting the other runner, while at the same time permitting the runners to be swung to the right or to the left for the purpose of steering the sleigh.

The running gear comprises a reach bar 10 extending centrally and longitudinally in a rearward direction from the front truck bolster which is formed with a hole 11 in which the cross-sectionally round forward part of the reach bar is journaled, a pin 12 being inserted through the forward extremity of the reach bar to prevent longitudinal sliding movement of the latter, the pin 12 bearing against the inner face of an extension or loop 13 formed at the rear end of a brace 14 which inclines upwardly and forwardly toward its front end which is fastened at 15 to the front cross bar 16 of the frame or body A.

Front hounds 20 are flexibly attached at their forward extremities to the front truck bolster 2 by means of clips 21 in connection with which horizontal pivots 22 are employed to allow for a certain amount of flexibility between said hounds and bolster. The front hounds 20 converge rearwardly and are fixedly secured to a block or bearing member 23 formed with a bearing opening adapting said block to turn on the reach bar 10, the latter being round in cross section where it passes through the block 23. By the means described, the front hounds have a swiveled mounting in relation to the rear hounds thus permitting the front and rear trucks to rock freely with relation to each other laterally of the sleigh. The flexibility between the front and rear trucks is thus obtained without perceptibly increasing or diminishing the distance between the engine or motor E and the rear driving axle and thereby in any way disturbing or impairing the efficiency of the transmission and differential gearing. The forward part of the body or frame A is fastened to a body bolster 24 which is formed as shown in Fig. 5 with upwardly diverging lower faces adapting the bolster 24 to rock upon the truck bolster 2 to which it is pivotally connected at 25. Thus the front runners may rise and fall or rock in a fore and aft direction without disturbing the horizontality of the body or frame of the sleigh.

The mechanism for swinging the front runners to either side for steering the sleigh, embodies a steering post 53 provided at its upper end with the usual hand control wheel 54 and having fast thereon below the platform or floor D a pinion 55 which meshes with a relatively large gear 56 on an upright shaft 57 journaled in a bearing 58 under the platform and having its lower end supported by a hanger 59 secured at its extremities to the body or frame A. The lower extremity of the steering shaft 53 is stepped or journaled in a strap 60 fastened at one end to the hanger 59 and at its forward end with a front body bolster 2. A steering rod 61 has one end connected to the large gear 56 and the other extremity connected to a link or connecting rod 62 which is pivotally attached at its opposite extremities to arms 63 extending from the knees 3 as best shown in Figs. 5 and 6. This enables both of the front runners to be simultaneously turned.

Each of the front runners is provided with a longitudinally extending slot or recess 64 therein as shown in Figs. 6 and 7 and in said slot there is mounted a movable fin 65 pivotally mounted adjacent to its front end as shown at 66. Extending upwardly from the fin 65 is a standard or plunger 67 the upper end of which is reduced and extended through a guide opening 68 in the top of the knee. The standards or plungers 67 are provided with notches 69 to receive the opposite extremities of a spring bar 70 extending transversely of the sleigh and serving to press downwardly on the standards 67 in order to correspondingly depress the fins 65 so that they will cut into the road surface and enable the front runners to effectively steer the sleigh, preventing said runners from skidding or sliding laterally. The means for depressing and flexing the spring bar 70 comprises a manually operable lever 71, the lower arm of which beneath the floor or platform D is connected to one arm of a lever 72 fulcrumed between its ends at 73 on the body bolster 2 and carrying at the extremity of its other arm a roller 74. When the operator desires to use the fins, he manipulates the lever 71 so as to depress the roller 74, causing said roller to depress the central portion of the spring bar 70 and thereby depress the fins 65 by means of the standards 67, although depressed, the fins 65 upon coming in contact with a hard object or surface are permitted to yield upwardly and house themselves within the front runners by the yielding action of the flexible spring bar 70. In steering, the spring bar 70 moves longitudinally under the depressing roller 74, the latter serving to prevent wear on the bar 70.

Tubular mud and snow shields 85 extend upwardly from the main body of the front runners and inclose the standards or plungers 67 as shown in Figs. 6 and 7.

When the driver desires to steer or turn the machine to the right or left, he depresses the fins of the front runners by means within his reach, as hereinabove particularly described. He then turns the runners in the desired direction by means of the hand steering wheel. Furthermore, by reason of the construction described, the front and rear sets of runners may freely rock transversely of the body and independently of each other and each of the runners is adapted to rock in a fore and aft direction independently of the remaining runners. Thus the runners are adapted to accommodate themselves to all inequalities in the road surface without affecting the horizontality of the frame or body supported thereby.

Having thus described my invention, I claim:—

1. In a motor sleigh, a front truck bolster to which the front runners are pivotally connected to turn on substantially vertical axes, means for turning said front runners, depressible fins carried by the latter, and manually controlled yieldable means for depressing said fins.

2. In a motor sleigh, a front truck bolster to which the front runners are pivotally connected to turn on substantially vertical axes, means for turning said front runners, depressible fins carried by the latter, and manually controlled means for depressing said fins.

3. In a motor sleigh, a front truck bolster to which the front runners are pivotally connected to turn on substantially vertical axes, means for turning said front runners, depressible fins carried by the latter, standards rising from said fins, and a spring bar terminally engaging said standards to permit the latter to move upwardly and downwardly.

4. In a motor sleigh, a front truck bolster to which the front runners are pivotally connected to turn on substantially vertical axes, means for turning said front runners, depressible fins carried by the latter, standards rising from said fins, a spring bar terminally engaging said standards to permit the latter to move upwardly and downwardly, and manually controlled means for flexing said spring between the ends thereof.

5. In a motor sleigh, a front truck bolster to which the front runners are pivotally connected to turn on substantially vertical axes, means for turning said front runners, depressible fins carried by the latter, standards rising from said fins, a spring bar terminally engaging said standards to permit the latter to move upwardly and downwardly, and manually controlled means for flexing said spring between the ends thereof including a roller in relation to and against which said spring bar is slidable.

6. In a motor sleigh, steering means for turning the front runners, fins carried by the runners and yieldable in relation thereto, and manually controlled means for depressing said fins while permitting them to yield.

In testimony whereof I affix my signature in presence of two witnesses.

PETER H. SMITH.

Witnesses:
PERRY A. SHAW,
GEO. W. POTTER.

Copies of this patent may be obtained for five cents each, by addressing the "Commissioner of Patents, Washington, D. C."